US011067669B2

(12) United States Patent
Yan et al.

(10) Patent No.: US 11,067,669 B2
(45) Date of Patent: Jul. 20, 2021

(54) METHOD AND APPARATUS FOR ADJUSTING POINT CLOUD DATA ACQUISITION TRAJECTORY, AND COMPUTER READABLE MEDIUM

(71) Applicant: Baidu Online Network Technology (Beijing) Co., Ltd., Beijing (CN)

(72) Inventors: Miao Yan, beijing (CN); Yifei Zhan, beijing (CN); Xianpeng Lang, beijing (CN); Wang Zhou, beijing (CN); Xiong Duan, beijing (CN); Changjie Ma, beijing (CN)

(73) Assignee: Baidu Online Network Technology (Beijing) Co., Ltd., Beijing (CN)

( * ) Notice: Subject to any disclaimer, the term of this patent is extended or adjusted under 35 U.S.C. 154(b) by 334 days.

(21) Appl. No.: 16/232,756

(22) Filed: Dec. 26, 2018

(65) Prior Publication Data
US 2019/0204418 A1    Jul. 4, 2019

(30) Foreign Application Priority Data

Dec. 29, 2017    (CN) .......................... 201711479520.5

(51) Int. Cl.
*G01S 7/48*    (2006.01)
*G01S 17/42*    (2006.01)
*G01C 21/32*    (2006.01)

(52) U.S. Cl.
CPC ............ *G01S 7/4808* (2013.01); *G01C 21/32* (2013.01); *G01S 17/42* (2013.01)

(58) Field of Classification Search
CPC ........ G01C 21/32; G01S 17/42; G01S 7/4808
USPC ...................................................... 702/159
See application file for complete search history.

(56) References Cited

U.S. PATENT DOCUMENTS

| 2015/0317781 A1* | 11/2015 | Napier .................... G01S 7/497 348/46 |
| 2016/0189348 A1 | 6/2016 | Canter |
| 2018/0253625 A1 | 9/2018 | Jiang et al. |

FOREIGN PATENT DOCUMENTS

| CN | 103745018 A | 4/2014 |
| CN | 103869820 A | 6/2014 |
| CN | 104374395 A | 2/2015 |
| CN | 105260988 A | 1/2016 |
| CN | 105783913 A | 7/2016 |

(Continued)

OTHER PUBLICATIONS

Fukao et al., "Method, device, and program for trajectory estimation", Publication No. JP 2017-4228 A, Published on Jan. 5, 2017. ip.com.*

*Primary Examiner* — John H Le
(74) *Attorney, Agent, or Firm* — Knobbe, Martens, Olson & Bear, LLP (57) ABSTRACT

Embodiments of the present disclosure can include a method and apparatus for adjusting a point cloud data acquisition trajectory, and a computer readable medium. According to the embodiments of the present disclosure, a trajectory may be adjusted based on a characteristic extracted from point cloud data. A parameter that needs to be adjusted may be selected according to the property of the characteristic, instead of adjusting all parameters at the same time. In addition, according to the embodiments of the present disclosure, when trajectories are fused, the sequence relationships between the trajectory points in the trajectories can be considered, which avoids that a loop cannot be closed.

13 Claims, 5 Drawing Sheets

(56) References Cited

FOREIGN PATENT DOCUMENTS

| | | | |
|---|---|---|---|
| CN | 106023587 | A | 10/2016 |
| CN | 106541945 | A | 3/2017 |
| CN | 106780729 | A | 5/2017 |
| CN | 107204014 | A | 9/2017 |
| JP | 2017004228 | A | 1/2017 |
| KR | 20090020251 | A | 2/2009 |
| WO | 2014076844 | A1 | 5/2014 |

\* cited by examiner

METHOD AND APPARATUS FOR ADJUSTING POINT CLOUD DATA ACQUISITION TRAJECTORY, AND COMPUTER READABLE MEDIUM

CROSS-REFERENCE TO RELATED APPLICATIONS

This application claims priority to Chinese Application No. 201711479520.5, filed on Dec. 29, 2017 and entitled "Method and Apparatus for Adjusting Point Cloud Data Acquisition Trajectory, and Computer Readable Medium," the entire disclosure of which is hereby incorporated by reference.

TECHNICAL FIELD

The embodiments of the present disclosure relate to the field of high-precision map, and specifically to a method and apparatus for adjusting a point cloud data acquisition trajectory, and a computer readable medium.

BACKGROUND

In recent years, with the widespread attention to the autonomous driving, the high-precision map technology has been rapidly developed. In particular, for the autonomous driving of a highly autonomous driving level (L3), the high-precision map is absolutely necessary. In the existing high-precision map technology, a large amount of point cloud data needs to be acquired. The point cloud data are used for the making of the high-precision map by performing processing such as registration on the point cloud data. Since the amount of the point cloud data is usually large, the traditional matching on the total amount of point cloud data needs to consume a large amount of time and storage space.

SUMMARY

In summary, the embodiments of the present disclosure relate to a solution for adjusting a point cloud data acquisition trajectory.

In a first aspect, the embodiments of the present disclosure provide a method for adjusting a point cloud data acquisition trajectory. The method includes: acquiring, in response to first point cloud data and second point cloud data acquired by a mobile entity having matching characteristics, a first trajectory used by the mobile entity to acquire the first point cloud data and a second trajectory used by the mobile entity to acquire the second point cloud data; determining a to-be-adjusted parameter set of trajectory points in the first trajectory based on the matching characteristics, the first trajectory, and the second trajectory; and fusing the first trajectory and the second trajectory by adjusting the parameter set of the trajectory points.

In a second aspect, the embodiments of the present disclosure provide an apparatus for adjusting a point cloud data acquisition trajectory. The apparatus includes: an acquiring module, configured to acquire, in response to first point cloud data and second point cloud data acquired by a mobile entity having matching characteristics, a first trajectory used by the mobile entity to acquire the first point cloud data and a second trajectory used by the mobile entity to acquire the second point cloud data; a determining module, configured to determine a to-be-adjusted parameter set of trajectory points in the first trajectory based on the matching characteristics, the first trajectory, and the second trajectory; and a fusing module, configured to fuse the first trajectory and the second trajectory by adjusting the parameter set of the trajectory points.

In a third aspect, the embodiments of the present disclosure provide a device. The device includes one or more processors; and a storage apparatus, configured to store one or more programs. The one or more programs, when executed by the one or more processors, cause the one or more processors to implement the method according to the first aspect of the present disclosure.

In a fourth aspect, the embodiments of the present disclosure provide a computer readable medium storing a computer program. The program, when executed by a processor, implements the method according to the first aspect of the present disclosure.

It should be understood that the contents described in the present disclosure are not intended to limit crucial or essential features of the embodiments of the present disclosure, and not used to limit the scope of the present disclosure. Other features of the present disclosure will be easily understood through the following descriptions.

BRIEF DESCRIPTION OF THE DRAWINGS

The above and other features, advantages, and aspects of the embodiments of the present disclosure will become more apparent in combination with the accompanying drawings and with reference to the following detailed descriptions. In the accompanying drawings.

In all the accompanying drawings, the same or similar reference numerals represent the same or similar elements.

DETAILED DESCRIPTION OF EMBODIMENTS

The embodiments of the present disclosure will be described in more detail below with reference to the accompanying drawings. Certain embodiments of the present disclosure are shown in the accompanying drawings. However, it should be appreciated that the present disclosure may be implemented in various forms, and should not be interpreted as being limited by the embodiments described herein. Conversely, the embodiments are provided for a more thorough and complete understanding for the present disclosure. It should be understood that the accompanying drawings and embodiments in the present disclosure are only illustrative, and not used to limit the scope of protection of the present disclosure.

As used herein, the term "comprising" and variants thereof are open-ended (i.e., "including, but not limited to"). The term "based on" refers to "at least partially based on." The term "one embodiment" represents "at least one embodiment." The terms "another embodiment" represents "at least one additional embodiment." Definitions of other terms will be given in the following description.

The term "point cloud data" used herein refers to a set of vectors in a three-dimensional coordinate system. These vectors are usually represented in the form of three-dimensional coordinates of X, Y, and Z, and generally used to represent the shape of the outer surface of an object. The point cloud data may also represent the RGB color, the gray-scale value, the depth, and the partitioning result of a point. As used herein, the term "characteristic/characteristic point" refers to the characteristic that can reflect the essence of the image, and can identify the target object in the image.

As mentioned above, in the traditional solutions the registration is generally performed directly on the point cloud data. In such case, the point cloud data itself needs to give a good initial value. Further, since a plurality of iterations may be required, a large amount of time and may be consumed when directly processing the point cloud data. The directly processing on the point cloud data is only suitable for the scenario with a small amount of data. However, when making the high-precision map, a large amount of point cloud data needs to be processed. Thus, the traditional solution of directly processing the point cloud data is not suitable for the high-precision map. Moreover, when performing the registration on the point cloud data, in general, the traditional solution is only limited to the matching relationship between two frames of data without considering a point cloud data acquisition trajectory as a whole. In such case, the trajectory such as a loop is usually caused, and thus, the closed loop cannot be accurately formed.

According to the embodiments of the present disclosure, a solution for adjusting a point cloud data acquisition trajectory is provided. In this solution, the characteristics in the point cloud data are extracted for fusing the trajectories that are used to acquire the point cloud data. When the trajectories for acquiring the point cloud data are fused, the positional parameters of the trajectory points in the trajectories may be correspondingly adjusted based on the characteristics. Further, when fusing the trajectories for acquiring the point cloud data, the sequence relationships between the trajectory points in the trajectories may also be considered to improve the precision of the fusion.

Figure 1:
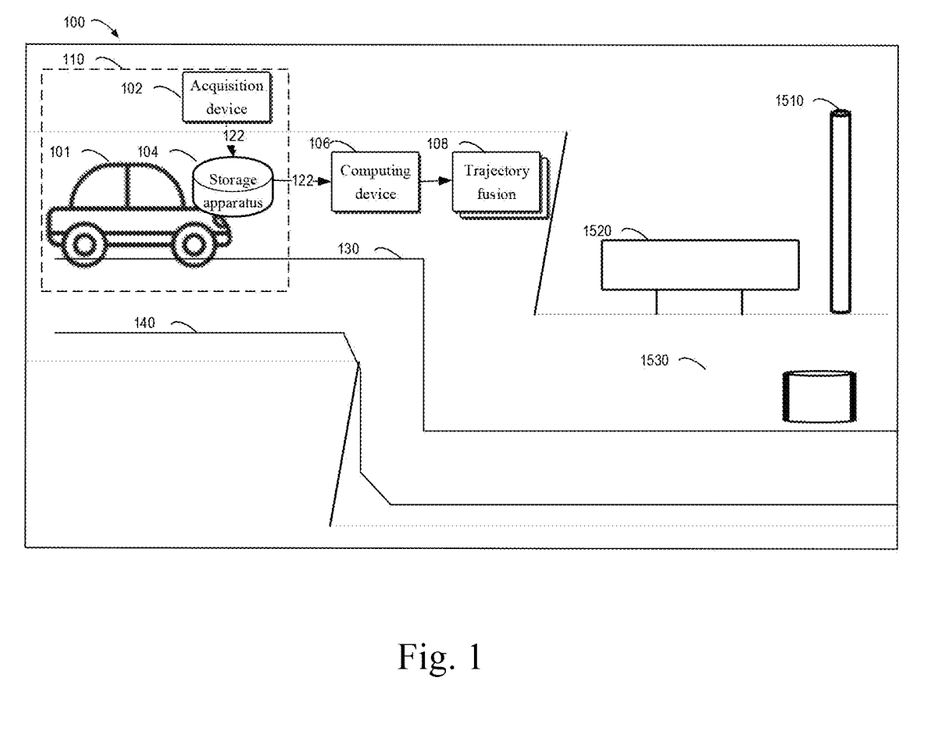
FIG. 1 illustrates a block diagram of an environment in which embodiments of the present disclosure may be implemented.

FIG. 1 illustrates a schematic diagram of an environment 100 in which embodiments of the present disclosure may be implemented. The environment 100 may include a mobile entity 110 and a computing device 106. The mobile entity may include a mobile device 101, a acquisition device 102 for acquiring the point cloud data 122, and a storage apparatus 104 for storing the point cloud data 122. The mobile device 101 may be any movable device. For example, the mobile device 101 may be a vehicle.

The acquisition device 102 may be disposed on the mobile device 101. The acquisition device 102 may be any proper 3D scanning device. For example, the acquisition device 102 may be a lidar device. Alternatively, the acquisition device 102 may be a stereo camera. The acquisition device 102 may also be a time-of-flight camera.

The trajectory 130 and the trajectory 140 are the trajectories of the mobile device 101 at different time phases. The mobile entity 110 may respectively acquire point cloud data in the trajectory 130 and the trajectory 140 through the acquisition device 102. The point cloud data acquired by the acquisition device 102 may be stored in the storage apparatus 104. The storage apparatus 104 may be a local storage apparatus. For example, the storage apparatus 104 may be located on the mobile device 101 together with the acquisition device 102. The storage apparatus 104 may also be a remote storage apparatus. For example, the acquisition device 102 may send the acquired point cloud data to the remote storage apparatus 104.

In the environment 100, a cylindrical object 1510, a planar object 1520, and a ground object 1530 are also included. Characteristics reflecting the objects may be extracted from the point cloud data 122 acquired by the acquisition device 102. The computing device 106 may obtain the point cloud data 122 from the storage apparatus 104. The computing device 106 may extract the characteristics from the point cloud data 122, and adjust the trajectory points in the trajectory 130 and the trajectory 140 based on the characteristics, to fuse the trajectory 130 and the trajectory 140.

It should be appreciated by those skilled in the art that though FIG. 1 illustrates the environment 100 in which the embodiments of the present disclosure may be implemented, the embodiments of the present disclosure may be implemented in any other proper environment. The environment 100 shown in FIG. 1 is merely and not restrictive. It may be appreciated that the numbers of the mobile entity 110, the computing device 106, the trajectories 130 and 140, the cylindrical object 1510, the planar object 1520, and the ground object 1530 shown in the environment 100 in FIG. 1 are merely exemplary. The environment 100 may include any suitable number of the mobile entities 110, the computing devices 106, the trajectories 130 and 140, the cylindrical objects 1510, the planar objects 1520, and the ground objects 1530. The environment 100 may also include other components not shown.

Figure 2:
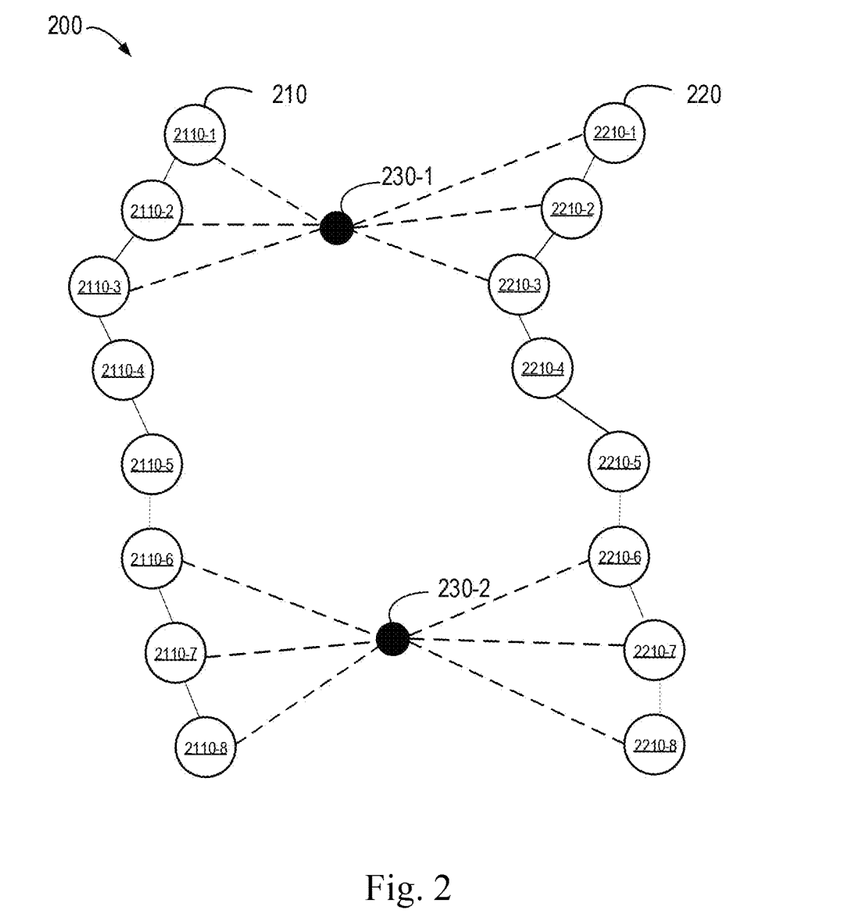
FIG. 2 illustrates a schematic diagram of trajectory fusion according to some embodiments of the present disclosure.

FIG. 2 illustrates a schematic diagram of trajectory fusion 200 according to some embodiments of the present disclosure. The trajectory 210 (which may be referred to as a "first trajectory") and the trajectory 220 (which may be referred to as a "second trajectory") may be the trajectories of the mobile entity 110 acquiring the point cloud data at different time phases. The trajectory 210 includes a plurality of trajectory points, for example, the trajectory points 2110-1, 2110-2, 2110-3, 2110-4, 2110-5, 2110-6, 2110-7, 2110-8, . . . , 2110-N (not shown) (collectively referred to as the "trajectory points 2110"). Similarly, the trajectory 220 includes a plurality of trajectory points, for example, the trajectory points 2210-1, 2210-2, 2210-3, 2210-4, 2210-5, 2210-6, 2210-7, 2210-8, . . . , 2210-N (not shown) (collectively referred to as the "trajectory points 2210").

The trajectory point has corresponding positional parameters, which may be obtained in various ways. For example, the positional parameters of the trajectory point may be obtained by a global positioning system (GPS). The positional parameters of the trajectory point may include parameters of the X-axis, the Y-axis, and the Z-axis in a Cartesian coordinate system. The positional parameters of the trajectory point may also include angle parameters. For example, the positional parameters may include a parameter of a pitch angle rotating around the X-axis, a parameter of a yaw angle rotating around the Y-axis, and a parameter of a roll angle rotating around the Z-axis.

The characteristic 230-1 and the characteristic 230-2 (collectively referred to as the "characteristics 230") are characteristics which can be extracted both from the point cloud data acquired based on the trajectory 210 and from the point cloud data acquired based on the trajectory 220. The characteristic 230-1 and the characteristic 230-2 may be cylindrical object characteristics representing a cylindrical object (e.g., the cylindrical object 1510). Alternatively, the characteristic 230-1 and the characteristic 230-2 may be ground characteristics representing a ground object (e.g., the ground object 1530). The characteristic 230-1 and the characteristic 230-2 may also be planar characteristics representing a planar object (e.g., the planar object 1520). It may be appreciated that the characteristic 230-1 and the characteristic 230-2 may be different characteristics, and may also be the same characteristic. The embodiments according to the present disclosure will be further described below with reference to FIGS. 3-4. It may be understood that the example in which two trajectories are adjusted is described only for the purpose of explanation. In the embodiments of the present disclosure, a plurality of trajectories may be adjusted, for example, three or more trajectories may be adjusted.

Figure 3:
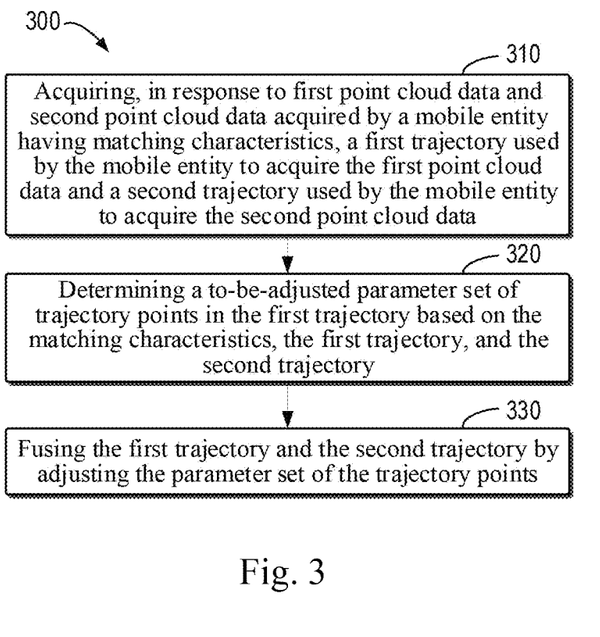
FIG. 3 illustrates a flowchart of a method according to some embodiments of the present disclosure.

At block 310, if the first point cloud data and the second point cloud data acquired by the mobile entity 110 have the matching characteristics 230, the computing device 106 acquires the trajectory 210 used by the mobile entity 110 to acquire the first point cloud data and the trajectory 220 used by the mobile entity 110 to acquire the second point cloud data. The computing device 106 may obtain the characteristics of the point cloud data in any suitable way. For example, the computing device 106 may obtain the characteristics in the point cloud data through a manual input. In some embodiments, a plurality of sets of point cloud data acquired by the mobile entity 110 all have matching characteristics, and the computing device 106 may obtain the trajectories used by the mobile entity 110 to acquire the sets of point cloud data. For example, the computing device 106 may obtain the trajectories 210, 220, and 240 (not shown), which are used by the mobile entity 110 to acquire these sets of point cloud data.

Alternatively, in some embodiments, the computing device 106 may extract the characteristic in each frame of point cloud data. Specifically, the computing device 106 may determine a ground point cloud, a planar point cloud, the point cloud of the cylindrical object, and/or other point clouds from the point cloud data. Then, the computing device 106 may respectively extract the characteristics in the ground point cloud, the planar point cloud, and the point cloud of the cylindrical object. For example, the computing device 106 may extract the ground characteristic based on the ground point cloud, the planar characteristic based on the planar point cloud, the cylindrical object characteristic based on the point cloud of the cylindrical object, and so on.

In the embodiments, the device 106 may convert the characteristics extracted from different pieces of point cloud data into the same coordinate system. If the difference between the characteristics extracted from the different pieces of point cloud data in the same coordinate system is within a predetermined threshold (also referred to as "threshold difference"), the characteristics may be considered to be matching. That is, the different pieces of point cloud data from which the characteristics are extracted have matching characteristics. For example, when the characteristic 230-1' (not shown) extracted from the first point cloud data and the characteristic 230-1" (not shown) extracted from the second point cloud data are matching, the first point cloud data and the second point cloud data have the matching characteristics 230-1. The characteristic (e.g., 230-1') is rigidly connected to the trajectory point to which the characteristic belongs. On this basis, the computing device 106 may obtain the trajectory 210 for acquiring the first point cloud data and the trajectory 220 for acquiring the second point cloud data. In this way, the computing device 106 may greatly reduce the amount of the point cloud data that needs to be processed, thereby enhancing the processing speed.

At block 320, the computing device 106 determines a to-be-adjusted parameter set of the trajectory points 2110 in the trajectory 210 based on the matching characteristics 230, the trajectory 210 and the trajectory 220. For example, the characteristic 230-1 is a matching characteristic, and the trajectory points 2110-1, 2110-2, and 2110-3 in the trajectory 210 and the trajectory points 2210-1, 2210-2, and 2210-3 in the trajectory 220 are the trajectory points associated with the characteristic. The computing device 106 may determine a set of parameters having maximum differences between the trajectory points 2110-1, 2110-2, and 2110-3 and the trajectory points 2210-1, 2210-2, and 2210-3. The computing device 106 may define the set of parameters having the maximum differences as the to-be-adjusted parameter set of the trajectory points. For example, the computing device 106 may define the Z-axis parameter, the pitch angle parameter and the roll angle parameter having the maximum differences as the to-be-adjusted parameter set. In this way, a parameter may be correspondingly adjusted according to the properties of the characteristics, instead of adjusting all the parameters at the same time, thereby further improving the efficiency of the fusion. As described above, in some embodiments, the computing device 106 may acquire a plurality of trajectories of the mobile entity 110 acquiring the point cloud data. The computing device 106 may determine a to-be-adjusted parameter set of trajectory points in the trajectories based on the matching characteristics and these trajectories.

Figure 4:
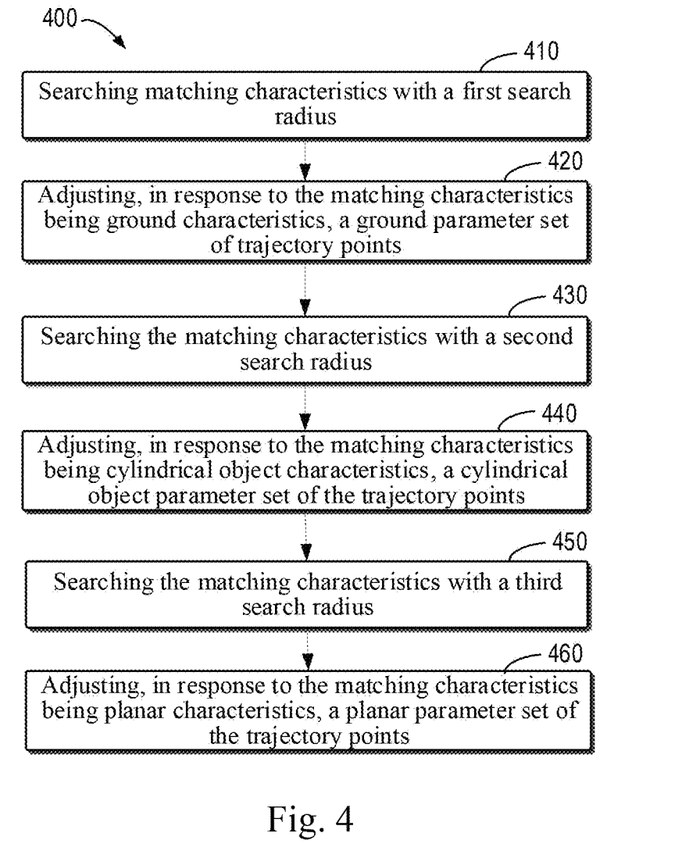
FIG. 4 illustrates a flowchart of a method according to some embodiments of the present disclosure.

The methods that may be implemented at block 320 will be described below with reference to FIG. 4. It may be appreciated that the method 400 illustrated in FIG. 4 is merely illustrative, and not restrictive. At block 410, the computing device 106 may search for the matching characteristics with a large search radius (which may be referred to as a "first search radius"). For example, the computing device 106 may search for the characteristic that may be matching (e.g., the characteristic 230-1" (not shown) extracted from the point cloud data acquired along the trajectory 220) in space within a certain distance and with the characteristic 230-1' (not shown) extracted from the point cloud data acquired along the trajectory 210 as a center.

At block 420, if the matching characteristics 230-1 are the ground characteristics, the device 106 may determine that the to-be-adjusted parameter set of trajectory points is a ground parameter set. In some embodiments, the ground parameter set includes a Z-axis parameter in the Cartesian coordinate system. Alternatively/additionally, the ground parameter set further includes a parameter of a pitch angle rotating around the X-axis, and a parameter of a roll angle rotating around the Z-axis. As merely an example, the device 106 may adjust the Z-axis parameters, the pitch angle parameters, and the roll angle parameters of the trajectory points in the trajectory 210 and the trajectory 220 to be the same. For example, the device 106 may adjust the heights of the trajectory 210 and the trajectory 220 in the Z direction, so that the two trajectories coincide in the Z-direction, and the ground characteristics are the same as the normal vectors of the grounds respectively corresponding to the trajectory 210 and the trajectory 220.

At block 430, the computing device 106 may search for the matching characteristics with a small search radius (which may be referred to as a "second search radius"). The computing device 106 has searched the characteristics with the large radius at block 410 to perform the adjusting. The small search radius at block 430 may make the to-beadjusted parameters of the trajectory 210 and the trajectory 220 more precise, thereby obtaining a more accurate fusion result.

At block 440, if the matching characteristics 230-2 are the cylindrical object characteristics, the device 106 may determine that the to-be-adjusted parameter set of trajectory points is a cylindrical object parameter set. In some embodiments, the cylindrical object parameter set may include X-axis parameters and Y-axis parameters in the Cartesian coordinate system. For example, in an actual application scenario, the cylindrical object may be an object such as a street lamp. As merely an example, the device 106 may adjust the X-axis parameters and the Y-axis parameters of the trajectory points in the trajectory 210 and the trajectory 220 to be the same.

At block 450, the computing device 106 may search for the matching characteristics with a smaller search radius (which may be referred to as a "third search radius"). As described above, the computing device 106 has performed two searches for the matching characteristics. Thus, the matching degree of the matching characteristics searched at block 450 is higher.

At block 460, if the matching characteristics are planar characteristics, the device 106 may determine that the to-be-adjusted parameter set of trajectory points is a planar parameter set. In some embodiments, the planar parameter set may include X-axis parameters and Y-axis parameters in the Cartesian coordinate system. Alternatively/additionally, the planar parameter set may further include a yaw angle rotating around the Y axis. In the actual scenario, the planar characteristic may be a small plane (e.g., a billboard) perpendicular to the ground surface. As merely an example, the device 106 may adjust the X-axis parameters and the Y-axis parameters of the trajectory points in the trajectory 210 and the trajectory 220 and the yaw angle rotating around the Y axis to be the same, which makes the distance between the planes corresponding to the planar characteristics and respectively associated with the trajectory 210 and the trajectory 220 is 0 in the normal vector.

It may be appreciated that the sequence of adjusting the parameter sets is merely exemplary, and the parameter sets may be adjusted in any suitable sequence. The sequence in which the parameter sets are adjusted is associated with the characteristics of the point cloud data. In this way, the embodiments of the present disclosure may adjust the search range for the matching characteristics and the sequence of the to-be-adjusted parameter sets based on the characteristics of the point cloud data, thereby achieving a better optimization sequence.

Returning to FIG. 3, at block 330, the computing device 106 may fuse the trajectory 210 and the trajectory 220 by adjusting the parameter set of the trajectory points 2110. In some embodiments, the computing device 106 may fuse the trajectory 210 and the trajectory 220 based on the sequence relationship between the trajectory points in the trajectory 210 and the sequence relationship between the trajectory points in the trajectory 220. The device 106 may optimize the trajectory 210 and the trajectory 220 in any suitable way, to achieve a better fusion of the trajectory 210 and the trajectory 220. In some embodiments, the sequence relationship between the trajectory points in the trajectory 210 and the sequence relationship between the trajectory points in the trajectory 220 may be used as the parameters for optimizing the trajectory 210 and the trajectory 220. In this way, in the embodiments of the present disclosure the trajectories are fused using the positions of the trajectory points as a reference, which effectively avoids the problem that the loop cannot be closed, and further improves the accuracy of the trajectory fusion. As described above, in some embodiments, the computing device 106 may acquire the plurality of trajectories of the mobile entity 110 acquiring the point cloud data. The computing device 106 may fuse the trajectories by adjusting the parameter sets of the trajectory points in the trajectories. That is, the computing device 106 may fuse the plurality of trajectories simultaneously.

Figure 5:
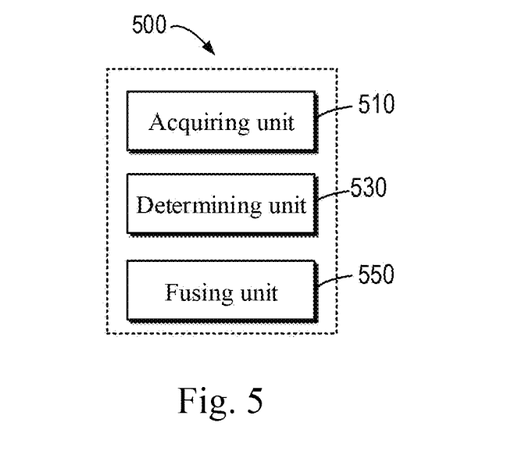
FIG. 5 illustrates a schematic block diagram of an apparatus according to some embodiments of the present disclosure.

FIG. 5 illustrates a schematic block diagram of an apparatus 500 for adjusting a point cloud data acquisition trajectory according to the embodiments of the present disclosure. As shown in FIG. 5, the apparatus 500 includes: an acquiring module 510, configured to acquire, in response to first point cloud data and second point cloud data acquired by a mobile entity having matching characteristics, a first trajectory used by the mobile entity to acquire the first point cloud data and a second trajectory used by the mobile entity to acquire the second point cloud data; a determining module 530, configured to determine a to-be-adjusted parameter set of trajectory points in the first trajectory based on the matching characteristics, the first trajectory, and the second trajectory; and a fusing module 550, configured to fuse the first trajectory and the second trajectory by adjusting the parameter set of the trajectory points.

In some embodiments, the acquiring module 510 includes: a characteristic acquiring sub-module (not shown), configured to acquire a first characteristic associated with the first point cloud data and a second characteristic associated with the second point cloud data; and a matching characteristic determining sub-module (not shown), configured to determine, in response to a difference between the first characteristic and the second characteristic being less than a threshold difference, the first point cloud data and the second point cloud data having the matching characteristics.

In some embodiments, the determining module 530 includes: a parameter set determining sub-module (not shown), configured to determine a set of parameters of a trajectory point in the first trajectory, the trajectory point having a maximum difference from a corresponding trajectory point in the second trajectory; and determine the to-be-adjusted parameter set of trajectory points based on the set of parameters of the trajectory point.

In some embodiments, the determining module 530 includes: a ground parameter set determining sub-module (not shown), configured to determine, in response to the matching characteristics being ground characteristics, the to-be-adjusted parameter set of trajectory points to be a ground parameter set, wherein the ground parameter set includes at least one of: a Z-axis parameter, a parameter of a pitch angle rotating around an X-axis, or a parameter of a roll angle rotating around a Z-axis in a Cartesian coordinate system.

In some embodiments, the determining module 530 includes: a cylindrical object parameter set determining sub-module, configured to determine, in response to the matching characteristics being cylindrical object characteristics, the to-be-adjusted parameter set of trajectory points to be a cylindrical object parameter set, wherein the cylindrical object parameter set includes at least one of: an X-axis parameter, or a Y-axis parameter in the Cartesian coordinate system.

In some embodiments, the determining module 530 includes: a planar parameter set determining sub-module (not shown), configured to determine, in response to the matching characteristics being planar characteristics, the to-be-adjusted parameter set of trajectory points to be a planar parameter set, wherein the planar parameter set includes at least one of: the X-axis parameter, the Y-axis parameter, or a parameter of a yaw angle rotating around a Y-axis in the Cartesian coordinate system.

In some embodiments, the fusing module 550 includes: a fusing sub-module (not shown), configured to fuse the first trajectory and the second trajectory based on a sequence relationship between trajectory points in the first trajectory and a sequence relationship between trajectory points in the second trajectory.

Figure 6:
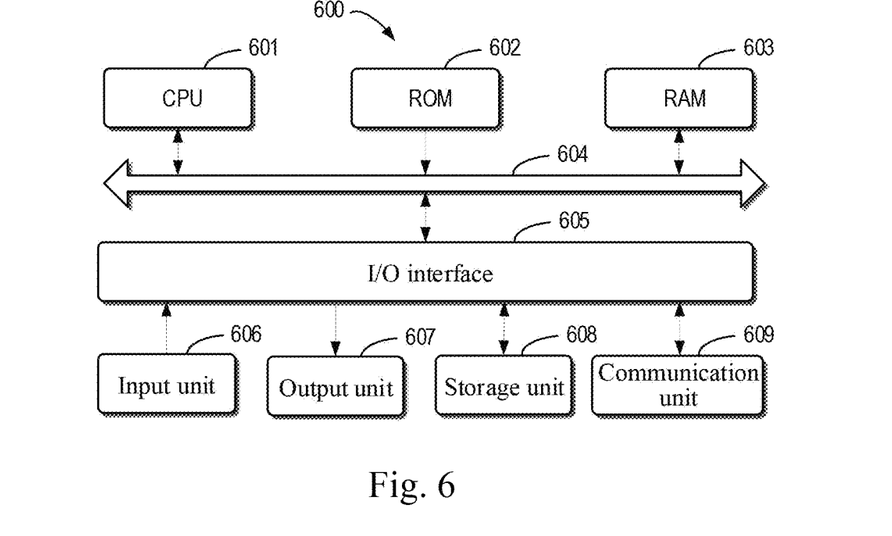
FIG. 6 illustrates a block diagram of a computing device implementing a plurality of embodiments of the present disclosure.

FIG. 6 shows a schematic block diagram of a device 600 capable of implementing various embodiments of the present disclosure. The device 600 may be used to implement the computing device 106 in FIG. 1. As shown in the figure, the device 600 includes a central processing unit (CPU) 601 that may perform various appropriate actions and processing in accordance with computer program instructions stored in a read only memory (ROM) 602 or computer program instructions loaded into a random access memory (RAM) 603 from a storage unit 608. In the RAM 603, various programs and data required for the operation of the device 600 may also be stored. The CPU 601, the ROM 602, and the RAM 603 are connected to each other through a bus 604. An input/output (I/O) interface 605 is also coupled to the bus 604.

A plurality of components in the device 600 are coupled to the I/O interface 605, including: an input unit 606, such as a keyboard or a mouse; an output unit 607, such as various types of displays, or speakers; the storage unit 608, such as a disk or an optical disk; and a communication unit 609 such as a network card, a modem, or a wireless communication transceiver. The communication unit 609 allows the device 600 to exchange information/data with other devices over a computer network such as the Internet and/or various telecommunication networks.

The processing unit 601 performs the various methods and processes described above, such as the process 300 and/or the process 400. For example, in some embodiments, the process 300 and/or the process 400 may be implemented as a computer software program that is tangibly embodied in a machine readable medium, such as the storage unit 608. In some embodiments, some or all of the computer programs may be loaded and/or installed onto the device 600 via the ROM 602 and/or the communication unit 609. When a computer program is loaded into the RAM 603 and executed by the CPU 601, one or more of the actions or steps of the process 300 and/or the process 400 described above may be performed. Alternatively, in other embodiments, the CPU 601 may be configured to perform the process 300 and/or the process 400 by any other suitable means (e.g., by means of firmware).

The functions described herein above may be performed, at least in part, by one or more hardware logic components. For example, and without limitation, exemplary types of hardware logic components that may be used include: Field Programmable Gate Array (FPGA), Application Specific Integrated Circuit (ASIC), Application Specific Standard Product (ASSP), System on Chip (SOC), Complex Programmable Logic Device (CPLD), and the like.

In general, the various embodiments of the present disclosure may be implemented in hardware, a special circuit, special software, a special logic, or any combination thereof. Some aspects may be implemented in the hardware, while other aspects may be implemented in firmware or software which may be executed by a controller, a microprocessor or other computing devices. When the various aspects of the embodiments of the present disclosure are illustrated or described as block diagrams, flowcharts, or some other diagrams for explanation, it will be understood that the blocks, devices, systems, techniques, or methods described herein may be used as non-limiting examples that are implemented in the hardware, the software, the firmware, the special circuit or logic, the general purpose hardware or controller, other computing devices, or some combinations thereof.

As an example, the embodiments of the present disclosure may be described in the context of machine-executable instructions. The machine-executable instructions are included in, for example, program modules executed in a device on a real or virtual processor of a target. Generally, the program modules include routines, programs, libraries, objects, classes, components, data structures, and the like, which perform a particular task or implement a particular abstract data structure. In various embodiments, the functions of the program modules may be combined or divided among the described program modules. The machine-executable instructions for the program modules may be executed in a local or distributed device. In the distributed device, the program modules may be in a local storage medium and a remote storage medium.

Program codes for implementing the method of some embodiments of the present disclosure may be written in any combination of one or more programming languages. These program codes may be provided to a processor or controller of a general purpose computer, special purpose computer or other programmable data processing apparatus such that the program codes, when executed by the processor or controller, enables the functions/operations specified in the flowcharts and/or block diagrams being implemented. The program codes may execute entirely on the machine, partly on the machine, as a stand-alone software package partly on the machine and partly on the remote machine, or entirely on the remote machine or server.

In the context of some embodiments of the present disclosure, the machine readable medium may be a tangible medium that may contain or store programs for use by or in connection with an instruction execution system, apparatus, or device. The machine readable medium may be a machine readable signal medium or a machine readable storage medium. The machine readable medium may include, but is not limited to, an electronic, magnetic, optical, electromagnetic, infrared, or semiconductor system, apparatus, or device, or any suitable combination of the foregoing. More specific examples of the machine readable storage medium may include an electrical connection based on one or more wires, portable computer disk, hard disk, random access memory (RAM), read only memory (ROM), erasable programmable read only memory (EPROM or flash memory), optical storage device, magnetic storage device, or any suitable combination of the foregoing.

In addition, although operations are described in a specific order, this should not be understood that such operations are required to be performed in the specific order shown or in sequential order, or all illustrated operations should be performed to achieve the desired result. Multitasking and parallel processing may be advantageous in certain circumstances. Likewise, although several specific implementation details are included in the above discussion, these should not be construed as limiting the scope of the present disclosure. Certain features described in the context of separate embodiments may also be implemented in combination in a single implementation. Conversely, various features described in the context of a single implementation may also be implemented in a plurality of implementations, either individually or in any suitable sub-combination.

Although the embodiments of the present disclosure are described in language specific to structural features and/or method logic actions, it should be understood that the subject matter defined in the appended claims is not limited to the specific features or actions described above. Instead, the specific features and actions described above are merely exemplary forms of implementing the claims.

What is claimed is:

1. A method for adjusting a point cloud data acquisition trajectory, comprising:
acquiring, in response to first point cloud data and second point cloud data acquired by a mobile entity including matching characteristics, a first trajectory used by the mobile entity to acquire the first point cloud data and a second trajectory used by the mobile entity to acquire the second point cloud data;
determining a to-be-adjusted parameter set of trajectory points in the first trajectory based on the matching characteristics, the first trajectory, and the second trajectory, the determining comprising:
comparing parameters of trajectory points in the first trajectory associated with the matching characteristics with parameters of trajectory points in the second trajectory associated with the matching characteristics, and
determining the parameters of the trajectory points in the first trajectory having differences with the parameters of the trajectory points in the second trajectory that are greater than a threshold for the to-be-adjusted parameter set to obtain the to-be-adjusted parameter set of trajectory points in the first trajectory; and
fusing the first trajectory and the second trajectory by adjusting the to-be-adjusted parameters in the to-be-adjusted parameter set of the trajectory points,
wherein the method is performed by at least one processor.

2. The method according to claim 1, wherein the determining the to-be-adjusted parameter set of trajectory points in the first trajectory further comprises:
determining, in response to the matching characteristics being ground characteristics, the to-be-adjusted parameter set of trajectory points to be a ground parameter set, wherein the ground parameter set includes at least one of: a Z-axis parameter, a parameter of a pitch angle rotating around an X-axis, or a parameter of a roll angle rotating around a Z-axis in a Cartesian coordinate system, wherein the X-axis represents a direction parallel to the ground, and the Z-axis represents a direction perpendicular to the ground.

3. The method according to claim 1, wherein the determining the to-be-adjusted parameter set of trajectory points in the first trajectory further comprises:
determining, in response to the matching characteristics being cylindrical object characteristics, the to-be-adjusted parameter set of trajectory points to be a cylindrical object parameter set, wherein the cylindrical object parameter set includes at least one of: an X-axis parameter, or a Y-axis parameter in a Cartesian coordinate system, wherein the X-axis represents a direction parallel to the ground, and the Y-axis represents a direction parallel to the ground and perpendicular to the X-axis.

4. The method according to claim 1, wherein the determining the to-be-adjusted parameter set of trajectory points in the first trajectory further comprises:
determining, in response to the matching characteristics being planar characteristics, the to-be-adjusted parameter set of trajectory points to be a planar parameter set, wherein the planar parameter set includes at least one of: an X-axis parameter, an Y-axis parameter, or a parameter of a yaw angle rotating around a Y-axis in a Cartesian coordinate system, wherein the X-axis represents a direction parallel to the ground, and the Y-axis represents a direction parallel to the ground and perpendicular to the X-axis.

5. The method according to claim 1, wherein the fusing the first trajectory and the second trajectory comprises:
fusing the first trajectory and the second trajectory based on a sequence relationship between trajectory points in the first trajectory and a sequence relationship between trajectory points in the second trajectory.

6. The method according to claim 1, wherein the acquiring the first trajectory and the second trajectory comprises:
acquiring a first characteristic associated with the first point cloud data and a second characteristic associated with the second point cloud data; and
determining, in response to a difference between the first characteristic and the second characteristic being less than a threshold difference, the first point cloud data and the second point cloud data including the matching characteristics.

7. An apparatus for adjusting a point cloud data acquisition trajectory, comprising:
at least one processor; and
a memory storing instructions, the instructions when executed by the at least one processor, cause the at least one processor to perform operations, the operations comprising:
acquiring, in response to first point cloud data and second point cloud data acquired by a mobile entity including matching characteristics, a first trajectory used by the mobile entity to acquire the first point cloud data and a second trajectory used by the mobile entity to acquire the second point cloud data;
determining a to-be-adjusted parameter set of trajectory points in the first trajectory based on the matching characteristics, the first trajectory, and the second trajectory, the determining comprising:
comparing parameters of trajectory points in the first trajectory associated with the matching characteristics with parameters of trajectory points in the second trajectory associated with the matching characteristics, and
determining the parameters of the trajectory points in the first trajectory having differences with the parameters of the trajectory points in the second trajectory that are greater than a threshold for the to-be-adjusted parameter set to obtain the to-be-adjusted parameter set of trajectory points in the first trajectory; and
fusing the first trajectory and the second trajectory by adjusting the to-be-adjusted parameters in the to-be-adjusted parameter set of the trajectory points.

8. The apparatus according to claim 7, wherein determining the to-be-adjusted parameter set of trajectory points in the first trajectory further comprises:
determining, in response to the matching characteristics being ground characteristics, the to-be-adjusted parameter set of trajectory points to be a ground parameter set, wherein the ground parameter set includes at least one of: a Z-axis parameter, a parameter of a pitch angle rotating around an X-axis, or a parameter of a roll angle rotating around a Z-axis in a Cartesian coordinate system, wherein the X-axis represents a direction parallel to the ground, and the Z-axis represents a direction perpendicular to the ground.

9. The apparatus according to claim 7, wherein determining the to-be-adjusted parameter set of trajectory points in the first trajectory further comprises:

determining, in response to the matching characteristics being cylindrical object characteristics, the to-be-adjusted parameter set of trajectory points to be a cylindrical object parameter set, wherein the cylindrical object parameter set includes at least one of: an X-axis parameter, or a Y-axis parameter in a Cartesian coordinate system, wherein the X-axis represents a direction parallel to the ground, and the Y-axis represents a direction parallel to the ground and perpendicular to the X-axis.

10. The apparatus according to claim 7, wherein determining the to-be-adjusted parameter set of trajectory points in the first trajectory further comprises:

determining, in response to the matching characteristics being planar characteristics, the to-be-adjusted parameter set of trajectory points to be a planar parameter set, wherein the planar parameter set includes at least one of: an X-axis parameter, an Y-axis parameter, or a parameter of a yaw angle rotating around a Y-axis in a Cartesian coordinate system, wherein the X-axis represents a direction parallel to the ground, and the Y-axis represents a direction parallel to the ground and perpendicular to the X-axis.

11. The apparatus according to claim 7, wherein the fusing the first trajectory and the second trajectory comprises:

fusing the first trajectory and the second trajectory based on a sequence relationship between trajectory points in the first trajectory and a sequence relationship between trajectory points in the second trajectory.

12. The apparatus according to claim 7, wherein the acquiring the first trajectory and the second trajectory comprises:

acquiring a first characteristic associated with the first point cloud data and a second characteristic associated with the second point cloud data; and determining, in response to a difference between the first characteristic and the second characteristic being less than a threshold difference, the first point cloud data and the second point cloud data including the matching characteristics.

13. A non-transitory computer storage medium storing a computer program, the computer program when executed by one or more processors, causes the one or more processors to perform operations, the operations comprising:

acquiring, in response to first point cloud data and second point cloud data acquired by a mobile entity including matching characteristics, a first trajectory used by the mobile entity to acquire the first point cloud data and a second trajectory used by the mobile entity to acquire the second point cloud data;

determining a to-be-adjusted parameter set of trajectory points in the first trajectory based on the matching characteristics, the first trajectory, and the second trajectory, the determining comprising:

comparing parameters of trajectory points in the first trajectory associated with the matching characteristics with parameters of trajectory points in the second trajectory associated with the matching characteristics, and determining the parameters of the trajectory points in the first trajectory having differences with the parameters of the trajectory points in the second trajectory that are greater than a threshold for the to-be-adjusted parameter set to obtain the to-be-adjusted parameter set of trajectory points in the first trajectory; and fusing the first trajectory and the second trajectory by adjusting the to-be-adjusted parameters in the to-be-adjusted parameter set of the trajectory points.

* * * * *